Dec. 2, 1969     S. P. APOSTOLESCU     3,481,559
HELICOPTER-AUTOMOBILE-BOAT AND AIR SUSPENSION CAR COMBINATION
Original Filed July 26, 1966     5 Sheets-Sheet 1
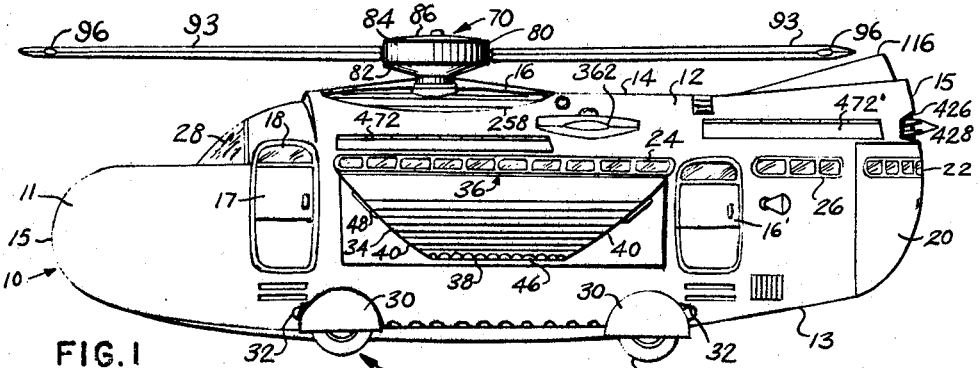
INVENTOR.
STEVEN POSTELSON APOSTOLESCU

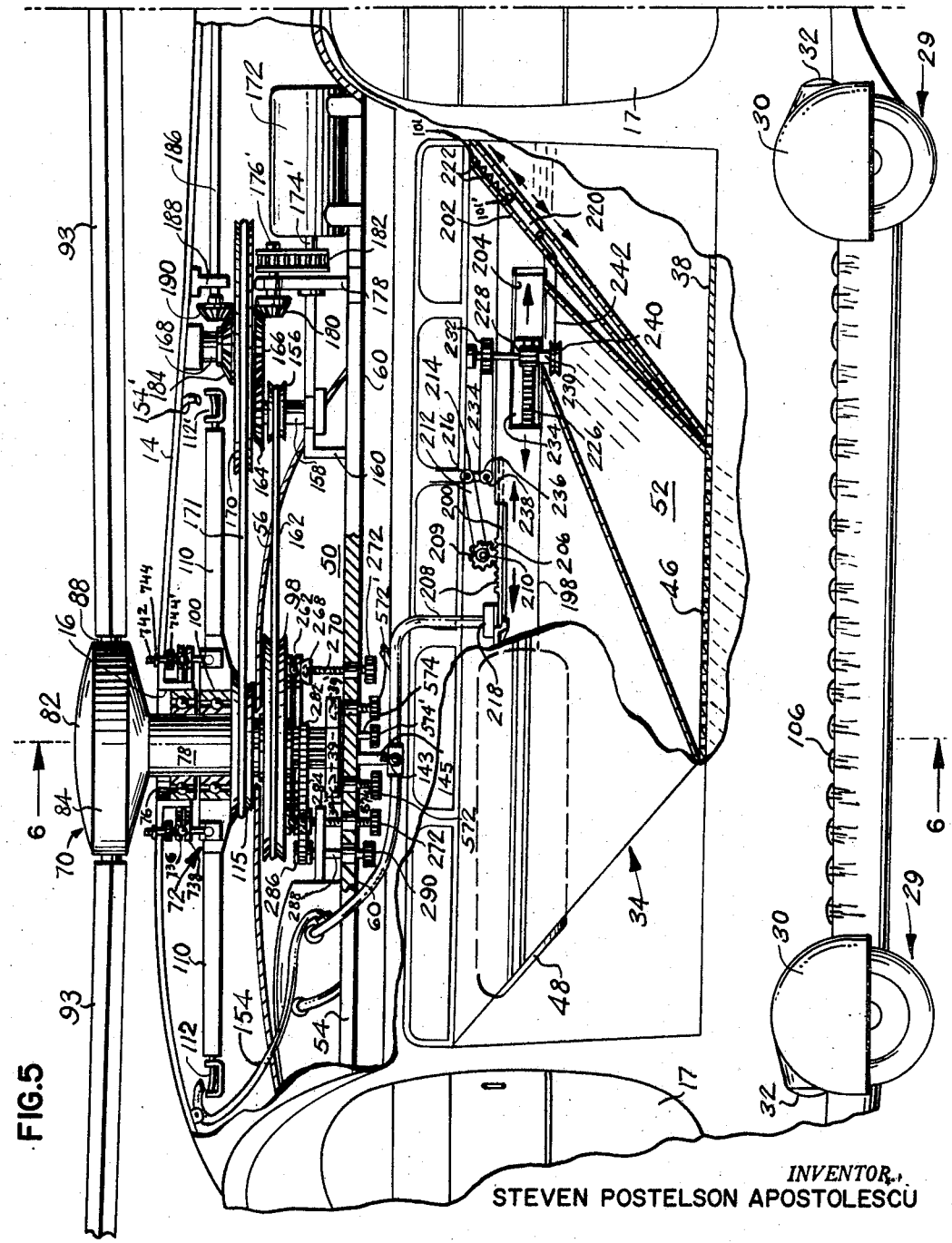

Dec. 2, 1969  S. P. APOSTOLESCU  3,481,559
HELICOPTER-AUTOMOBILE-BOAT AND AIR SUSPENSION CAR COMBINATION
Original Filed July 26, 1966  5 Sheets-Sheet 3
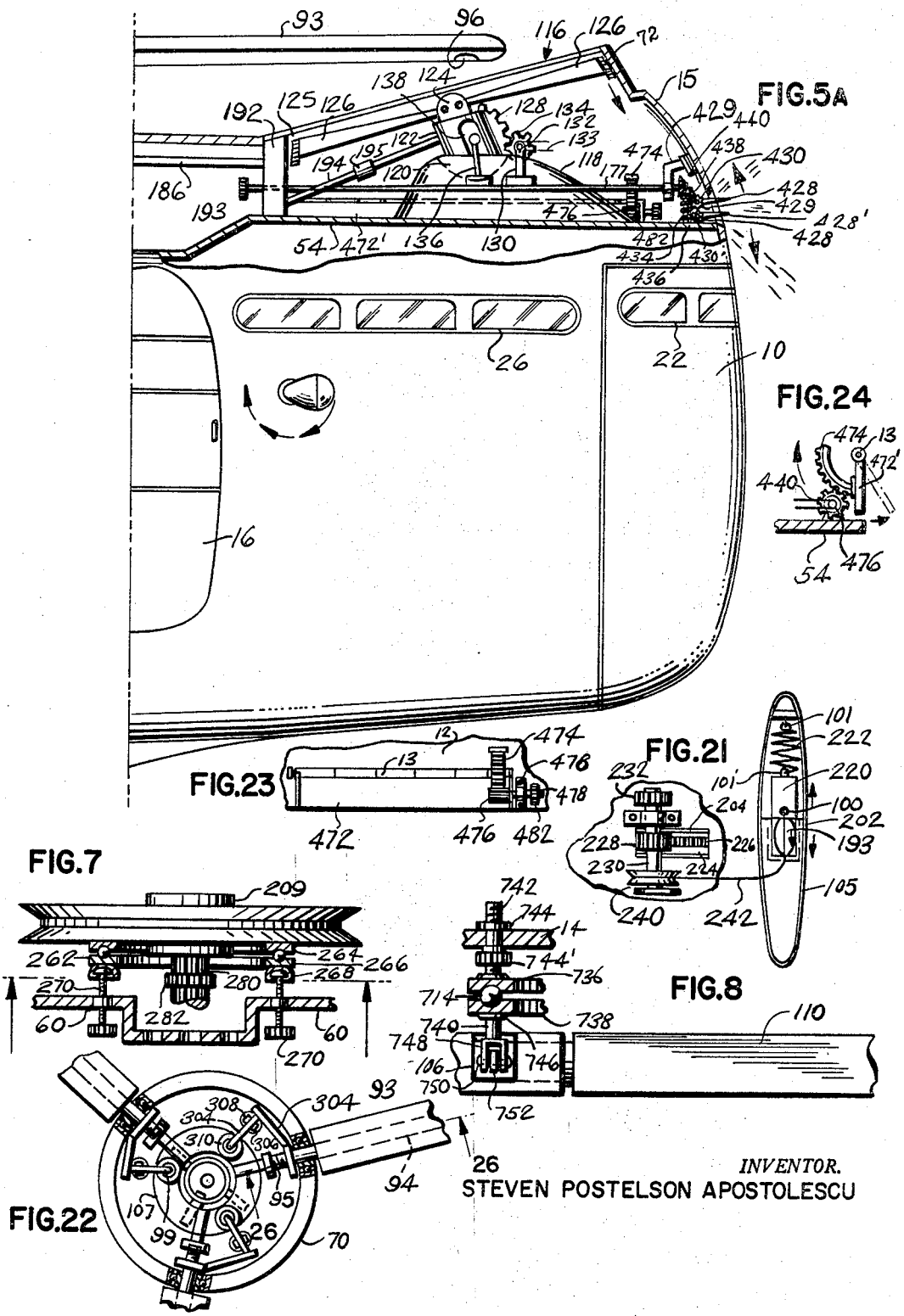
INVENTOR.
STEVEN POSTELSON APOSTOLESCU

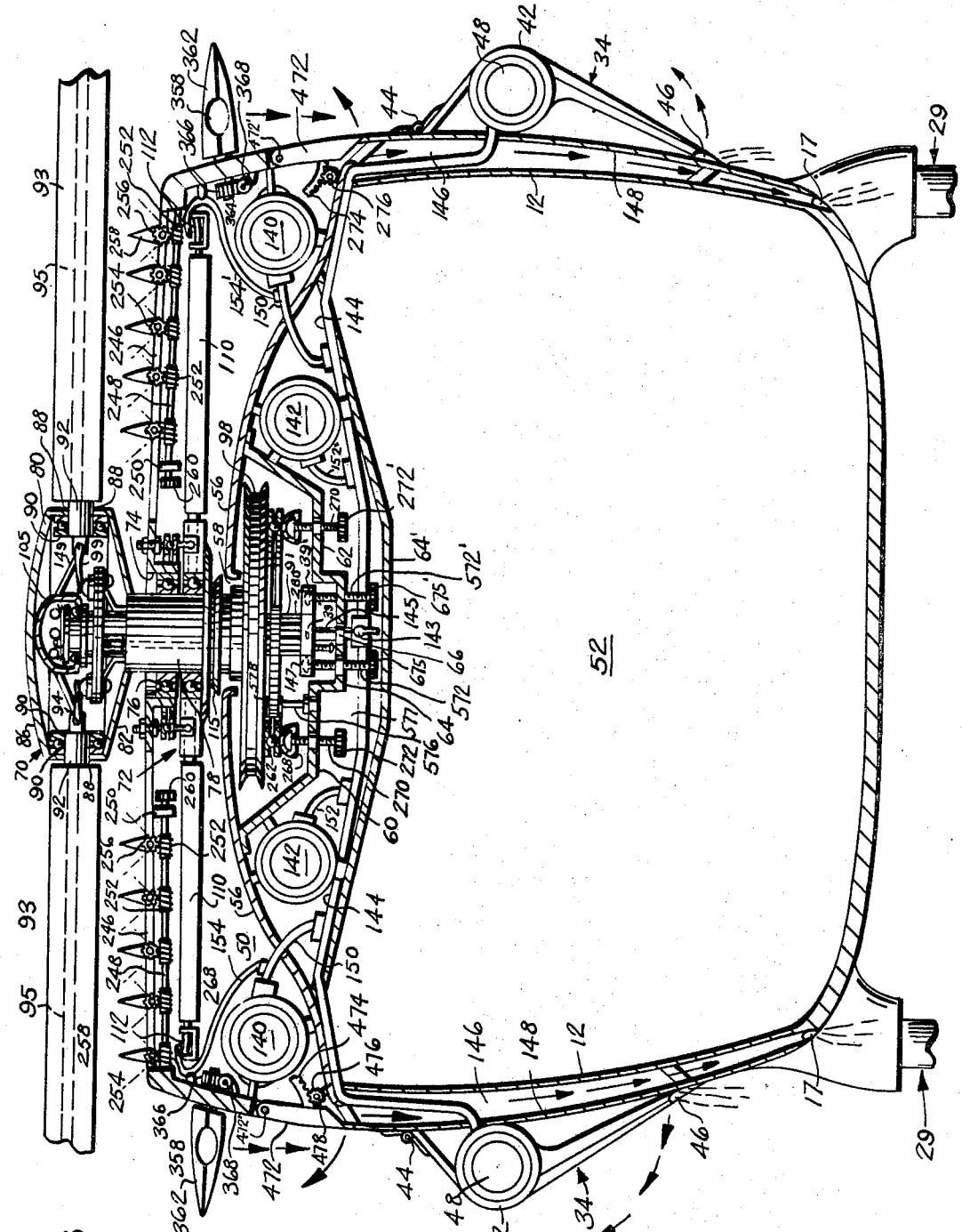

Dec. 2, 1969   S. P. APOSTOLESCU   3,481,559
HELICOPTER-AUTOMOBILE-BOAT AND AIR SUSPENSION CAR COMBINATION
Original Filed July 26, 1966   5 Sheets-Sheet 5
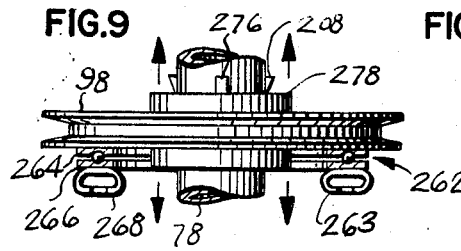
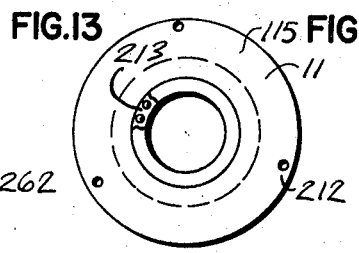
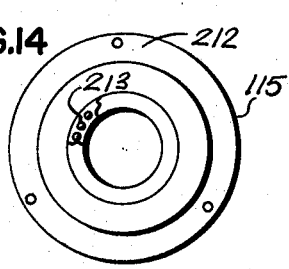
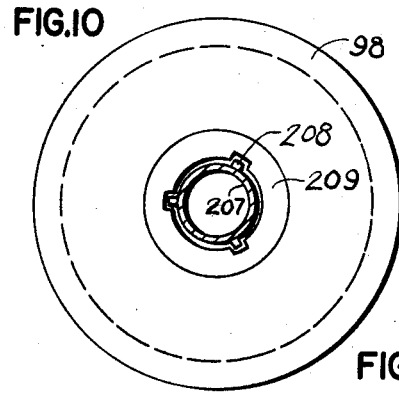
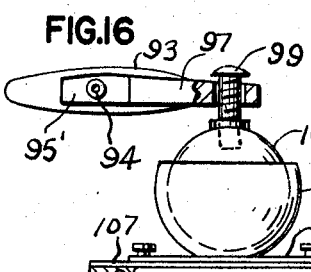
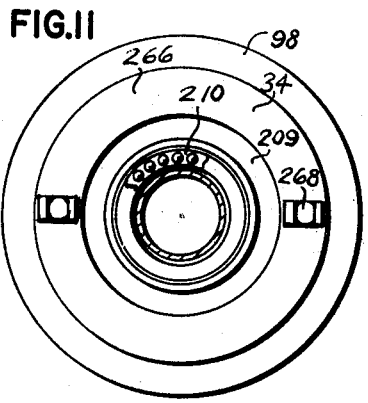
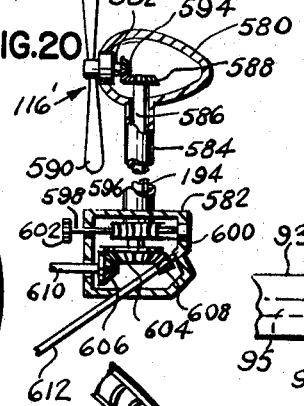
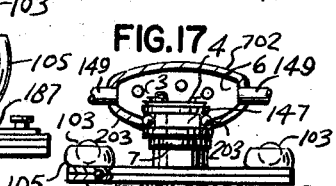
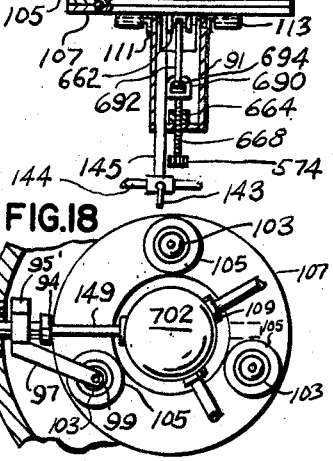
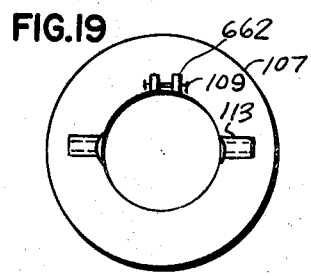
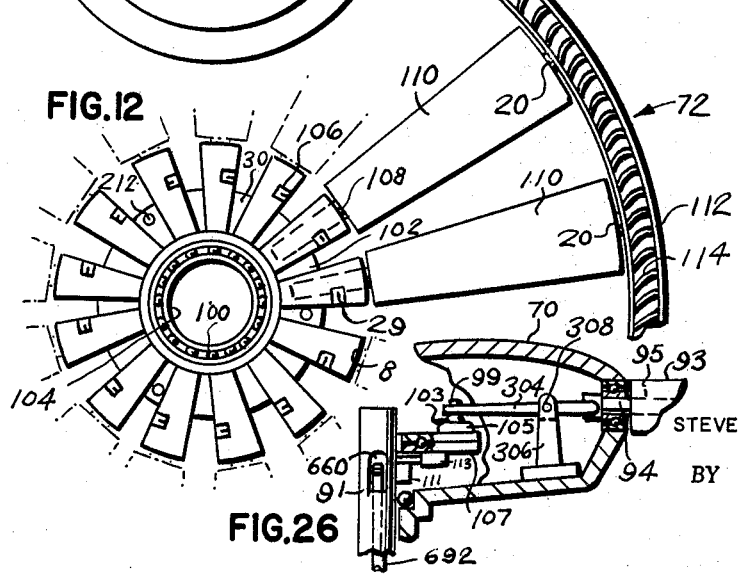
INVENTOR.
STEVEN POSTELSON APOSTOLESCU
BY

3,481,559
HELICOPTER-AUTOMOBILE-BOAT AND AIR SUSPENSION CAR COMBINATION

Steven Postelson Apostolescu, 419 W. 35th St., New York, N.Y. 10001
Continuation of application Ser. No. 568,019, July 26, 1966. This application Nov. 20, 1968, Ser. No. 778,918
Int. Cl. B60f 5/02, 3/00; B64c 37/00
U.S. Cl. 244—2                                    16 Claims

ABSTRACT OF THE DISCLOSURE

An aircraft is disclosed which is primarily a helicopter but which can also run on land and operate in water. The aircraft has a fuselage with a passenger carrying compartment. Two rotor units are coaxially disposed one above the other at the center of the fuselage. The upper rotor has blades which can be changed in pitch to vary lift and forward speed. The aircraft also has a tiltable third rear mounted rotor unit. The lower rotor unit and rear rotor unit cooperate in sustaining the aircraft, while the upper rotor unit serves for propelling, lifting and directing the aircraft.

---

This is a continuation of Ser. No. 568,019 filed July 26, 1966, now abandoned.

This invention relates generally to helicopters and more particularly to a helicopter with upper and lower central coaxial rotors and a rear or tail rotor, said rotors providing sustention and propulsion in the air.

An important object of the present invention is to provide a new and combined form of sustention and propulsion means for helicopters, which means includes coaxial upper and lower rotary units and a rear rotor unit. Sustention is principally provided by the lower rotor unit and the rear rotor unit the upper rotor unit being used for propelling, lifting and directing the helicopter in the air.

Another object is to provide a helicopter with coaxial rotors having blades of different sizes, different radii and which turn at different speeds.

Still another object of the invention is to provide a helicopter with central coaxial rotors, one of the rotors positioned inside the fuselage.

Yet another object is to provide a helicopter with central coaxial rotors and a rear or tail rotor and means for turning said rotors simultaneously and at different speeds.

A further object is to provide a helicopter driven by turbo-air compressors, jet engines and internal combustion engines, operating separately from the other so that failure of one does not interfere with the operation of the other, thereby adding a safety factor.

According to the invention, there is provided a a new and improved means to control the lateral and longitudinal stability and direction of the aircraft through elongated side doors and rear flaps or fins that control the direction of the exhausted compressed air from the lower and rear rotor units.

A double wall air chamber is provided on each side at the middle of the aircraft fuselage through which the air compressed by the rotor blades is compressed downward through the air chamber and against vents located at the bottom of the helicopter fuselage and into the atmosphere for proper and safe operation and which operation produces the air sustension effect so that the helicopter can be used for certain military or civilian operations.

The aircraft has side angular wings with jet engines mounted on the wings. A central exhaust pipe is horizontally connected to the engines in the wings. The exhaust pipe has three outlets or openings. A first opening leads to a pipe going upward to the main rotor unit and through a connection to a swivel joint and blades, to provide a very smooth drive free of vibration. The second opening on the exhaust pipe is located at the middle rear part of the pipe. This opening permits exhaust gases from the jet engines to go downward into the wings to vents located on the lower part of the wings and then to the atmosphere. This mode of operation is needed only for emergency landing or for extra lift when fast take off is needed. The third opening is at the end of the exhaust pipe at the edge of the rear part of the wings. The exhaust from the third opening is horizontal since the opening is vertically oriented. An arrangement of plates, gears, pulley and wire controls is provided so that when the rear third exhaust opening is opened, the center second opening is closed and vice versa. The arrangement provides driving power to the main rotor, jet power to the wings in flight and emergency safe landing. The aircraft can fly at high speed in air; it can run on roads like a land vehicle; it can maneuver like a boat on water, and it can serve as a car sustained in air for certain military or civilian uses.

The helicopter has three rotors driven by a combination of pulleys, gears and belts driven by turbo-air compressors, jet engines and a conventional gas engine. By this arrangement all rotors are controlled separately and each rotor is driven at a different speed, the top rotor slower, the lower rotor much faster and the tail rotor still faster. If one engine stops the others will still drive the rotors to provide safe operation.

The aircraft has tiltable side wings with jet engines that can provide great lifting power or drive at high speed.

In the aircraft are safety means consisting of two sets of fins mounted on the top of the fuselage above the lower rotor. These two sets of fins are tiltable and control the air intake of the lower rotor. This operation will prevent turning the aircraft over upon a swift change of direction or upon swift maneuvering.

The aircraft also has a coaxial rotor system so that the main rotor is driven by compressed air, jet gases or shaft engines. The lower rotor is mounted on the main rotor shaft and runs counterclockwise via pulley and belts from the central drive system.

The aircraft has a simple control for the pitch angle of the rotor blades. The lower rotor and rear rotor blades can be independently controlled. It is also possible to raise the rear rotor up to 45 degrees or more when in full flight to provide additional forward speed and improve longitudinal stability.

The aircraft has a main fuel pipe conducting compressed air and jet gases that drive the main rotor. The main rotor can be stopped to run only when necessary to land on very restricted areas. The main power of air and jet gases will be directed instead to a lower rotor-like turbine through auxiliary pipes. The main rotor pulley will be also lowered. By this maneuver only the lower rotor and the tail rotor will operate. This will be sufficient for a safe landing under normal conditions.

The aircraft has an efficient, reliable and simple control system for controlling the rotor system. There are improved means for controlling the angle of the blades separately or together in each rotor, for controlling the cyclic pitch for propulsion, and for directing the aircraft in the air through the same controls.

The aircraft also has an efficient system for controlling the cyclic change in pitch of the blades necessary for propulsion in combination with a rotor means.

The aircraft has therefore, improved means for efficient sustention, for emergency landings on very restricted areas, for efficient longitudinal stability in flight and swift maneuverability during flight, all of which are particularly advantageous for military and civil operations.

For further comprehension of the invention and of the objects and advantages thereof, reference will be had to the following description and accompanying drawings in which:

FIG. 1 is a side elevational view of a helicopter embodying the present invention.

FIG. 2 is a top plan view thereof, parts being shown broken away.

FIG. 3 is a rear elevational view thereof, parts being shown broken away.

FIG. 4 is a front elevational view thereof, parts being shown broken away.

FIG. 5 is an enlarged fragmentary vertical sectional view through the center of the helicopter, showing the coaxial rotors and associated parts.

FIG. 5A is a view similar to FIG. 5 showing the rear or tail rotor and associated parts.

FIG. 6 is an enlarged vertical sectional view taken on the plane of the line 6—6 of FIG. 5, parts being omitted.

FIG. 7 is a side elevational view of the main rotor pulley and associated parts, on an enlarged scale.

FIG. 8 is an enlarged side elevational view of a fragment of a blade of the lower coaxial rotor and associated parts.

FIG. 9 is an enlarged side elevational view of the lowermost pulley on the main motor shaft and associated parts.

FIG. 10 is a top plan view of the main motor pulley of FIG. 7.

FIG. 11 is a bottom plan view thereof.

FIG. 12 is an enlarged fragmentary plan view of the lower coaxial rotor assembly.

FIG. 13 is a top plan view of the pulley of the lower coaxial rotor.

FIG. 14 is a bottom plan view thereof.

FIG. 15 is a side elevational view thereof.

FIG. 16 is a detail side elevational view of the cam plate roll with the rolling pin and blade arm mounted thereon, for blade angle control, parts being shown broken away.

FIG. 17 is a detail, part elevational and part sectional view of the cyclic pitch control mechanism and the mechanism for distributing compressed air or gas.

FIG. 18 is a top plan view of the cam roller plate and associated parts, swivel joint and pipe connected to blades.

FIG. 19 is a bottom plan view thereof of the cam roll plate.

FIG. 20 is a part elevational and part sectional view of a modified form of rear or tail rotor assembly, parts being shown broken away, on a reduced scale.

FIG. 21 is a detail side elevational view of the mechanism for controlling the vertical downward movement of the exhaust gases and for controlling the horizontal backward movement of the bases.

FIG. 22 is a top plan view of the top section of a modified form of main coaxial rotor, parts being shown broken away.

FIG. 23 is a side elevational view of a side fuselage door showing the mechanism for opening and closing the door.

FIG. 24 is an end elevational view thereof.

FIG. 25 is a side elevational view of a wing structure showing the mechanism for tilting the same.

FIG. 26 is a fragmentary sectional view of the modified form of main coaxial rotor shown in FIG. 22.

Referring now in detail to the various views of the drawings, there is shown in FIG. 1 a helicopter 10 constructed in accordance with the present invention. The helicopter includes an elongated fuselage or body 11 including merging side, bottom, top and end walls, 12, 13, 14, 15, respectively. An opening 16 is formed in the top wall 14. Doors 17, 17 are provided in each side wall 12, the doors having top glass panels 18, and a pair of doors 20 is provided in the rear wall 15 with windows 22.

Windows 24 are formed in the side walls 12 at the top thereof between the doors 17, 17 and windows 26 between the doors 16 and rear doors 20. A window 28 is formed in the top wall 14 at the front between the doors 17, 17, thereat.

A pair of landing and driving gear structures 29, 29 is mounted on the bottom wall 13. The landing gear structures are protected by fenders or shields 30 that support lamps 32.

In each side wall 12, a wing structure 34 is provided midway the ends thereof. Each wing structure 34 in side elevation is generally triangular in shape with an elongated straight top edge 36, a straight but short bottom edge 38 and downwardly and inwardly slanting side edges 40, 40. Midway between the top and bottom edges, the body of each wing structure bulges outwardly as indicated at 42 (FIGS. 3 and 4). The top edge of each wing structure is hinged to the adjacent side wall 12 by a hinge device 44, and the bottom edge of each wing structure is formed with a series of air vents 46. A jet engine 48 is suitably supported on the inner surface of each wing structure at the bulge 42.

The interior of the fuselage at its center is divided into two compartments 50 and 52 by means of a platform 54 extending longitudinally of the fuselage. In accordance with the present invention, a coaxial rotor system is supported above the platform 54, in line with the opening 16 in the top wall 14 of the fuselage. A dome-shaped supporting plate 56 is supported on the platform and has a central opening 58 in line with the opening 16 in the top wall 14. A dish-shaped plate 60 is suitably suspended from the dome-shaped plate in the space between said plate and the platform 54. The bottom wall 62 of plate 60 is formed with a countersunk portion 64 formed with an axial opening 66 aligned with the opening 58 in the dome-shaped plate 56. The coaxial rotor system includes an upper main rotor unit 70 disposed outside of the fuselage and a lower auxiliary rotor unit 72 mounted inside of the fuselage. Each rotor unit has the same axis of rotation.

The edge wall of the opening 16 in the top wall 14 is formed with an annular flange 74 and supported in said flange in the usual manner is a ball bearing assembly 76, supporting a sleeve or shaft 78 of cylindrical shape. Shaft 78 extends outwardly of the top wall 14 and a hollow drum 80 is formed integrally on the top of the shaft 78. The drum has a bottom wall 82, a side wall 84 and a curved top wall 86. The side wall is provided with opposed openings 88. A ball bearing unit 90 is positioned in a recess in the drum in each side wall 84 around the opening therein. Each of the ball bearing units 90 support oscillatably therein one of the oscillatable horizontal axles 92 of blade 93 of which there are three. Each of the axles 92 is cylindrical and has a central passage 94 communicating with a central passage 95 in its respective blade 93. The other end of the passage 94–95 leads to an outlet opening 96 in the tip end of the blade 93.

Each blade axle 92 is formed with an extension 95' to which is attached one end of an arm 97. The other end of the arm is attached to a headed bolt 99 secured at one end to a ball member 103 tiltable in a cup member 105. The cup members are mounted in a circular cam roll plate 107 mounted at the top end of a tube 91 extending upwardly through the center of the first rotor unit shaft 78. The cam plate 107 has a central opening 109 and is tiltably mounted around the tube 91 on brackets 111 and hinges 113. The tube 91 has external linear threads 280 at its lower end and is slidably supported and turnably supported on its vertical position on frame 39. The two side ends of the frame 39 are formed like a clamp member. Two turnable threaded bolts 572 engage in the side ends of frame 39. The lower ends of the threaded bolt-shafts 572 are turnably mounted in threaded parts of the recessed plate 64. Two manually turnable handles 675 are provided at the lower end of the bolt-shafts 572. By turning handles 675 left or right the frame 39 with tube 91 goes up or down moving along the cam-roll plate 107. The arms 97 of the blades turn and change the pitch angle of the rotor blades 93 equally. At the lower part of the linear threaded tube 91, a chain 284 is slidably engaged at one end. The other end of the chain 284 is engaged to gear 286 mounted on the upper end of the shaft 288. The lower part of shaft 288 is free to turn engaged on a part of plate 60–60' plate 60 has no threads. Shaft 288 has mounted a manually turnable handle 290. By turning shaft 288, the chain 284 turns the tube 91 through the linear threaded part of the lower tube. This operation permits turning the whole tube 91 and cam control plate 107 to left or right. This movement will control the direction of the aircraft in flight. At the side of the upper part of the tube 91 is an elongated vertical opening 660; see FIG. 26. A rod 574 engages in a threaded nut 664 located at the lower inner side of the tube 91; see FIG. 17. The lower part 668 of the rod 574 is threaded also. The rod 574 extends in the tube 91 up to the elongated vertical opening 660. The upper end of the rod 574 has a clamp like member 690. Another rod 692 on its lower end has a head 694 engaged by the clamp-like member 690. The upper end of the rod 692 is hinged to brackets 662 on the bottom of the cam plate 107, by a pin. At the lower end of the rod 574 is a handle which can be grasped manually to turn a gear rod 574 left or right. By turning the rod 574 to the right the rod will rise upward pushing the rod 692 which will tilt the cam roll plate 107. This will automatically provide the cyclic change of pitch of the rotor blades 93. Lowering the rods 574–692 will eliminate the cyclic change of pitch of the blades 93.

The tube 91 has at its upper top end a round frame 147 secured on the tube by pin 7. On frame 147 is swivel joint 702 turnably mounted on ball bearings 203. The swivel joint 702 has a bulbous chamber 6 and flexible pipes 149 protruding from its sides. The lower-bottom end of the swivel joint 702 is open. The auxiliary air and gas pipe 145 is mounted in the tube 91 and extends above the upper end of the tube. A plate 4 is mounted on the top of the tube frame 147 by pins 3 to keep pipe 145 secured in a stationary position. The flexible pipes 149 are connected to the pipes 94 located at the middle of the blade extension member 95'. Thus when the air or gases come into the swivel joint through pipe 145 the air and gas are further pushed into blades 93 through air channel 95 and into the atmosphere through the exhaust outlets 96 at the tip end of blades 93. Thus operation provides power to turn the rotor 70 to provide sustention and propulsion for the aircraft in flight with a minimum of vibration.

A pulley 98 shown in FIG. 9 is movable in the outer surface of the shaft 78. Mounted on the pulley in line with the ball bearing assembly 76 is another ball bearing assembly 100. The ball bearing assembly 100 supports the auxiliary lower rotor unit 72; see FIG. 12. The lower rotor unit includes a circular plate 102 having a central opening 104 receiving the ball bearing assembly 100. The plate 102 has an annular recess 106 on its top surface. The periphery of the plate 102 is formed with opposed socket openings to receive the axles of the blades 110 radiating from the plate 102. A turbine ring 112 is supported at the end of blades 110 on pins 20. The ring-like turbine is provided with vanes 114.

The mechanism for controlling the pitch angle of the blades 110 of rotor unit 72 comprises a ball bearing 714. On the outer surface of ball bearing 714 threaded shafts 742 are fastened. A free turning double gear ring 744–744' is engaged in the top of the fuselage 14. The double gear ring has a central opening or passage and is provided with internal screw threads. The gear rings 744–744' are mounted on top of fuselage 14 on each side of the main rotor shaft 78 and keep the ball bearing 714 in a horizontal position. Rods 740 are fastened on the bottom surface of the ball bearing 738. The lower end of the rods 740 are hinged on a recessed slot protruding from axles 108 at opening 106. The lower end of the rods 740 has a forked structure 748 with holes 750 on each forked side. The forked side of the rods engage an oblong slot 752 in the axles 108. The slot has a hole 752'. A pin 754 keeps the forked rods 748 on the axles for effective operation. Moving ring 744' to the right raises the ball bearing and rods with blades, tilting the blades up.

Means are provided to move the pulley 98 up or down on the shaft 78. For this purpose a ball bearing unit 262 is positioned underneath the pulley 98. The top face 264 of the ball bearing unit is fastened to the outer surface of the pulley 98 whose bottom face 266 is movable. Opposed clamps 268 are fixed on the bottom surface of the lower face 266. A pair of threaded bolts 270 extend upwardly through opening in the bottom wall of the plate 60, the top end of the bolts are engaged in the clamps 268. Hand wells 272 are fixed on the bottom end of the bolts 270 outwardly of the plate 60. When the bolts are turned in one direction the pulley 98 rises and its hub 278 engages tapered lugs 276 on the shaft 78 fastening the pulley on the shaft. When the bolts are turned in opposite direction the pulley 78 and its associate parts move downwardly away from the fastened lugs and the pulley turns freely on shaft 78. At the same time the air and gas flow is prevented from going into the main rotor head 70 and instead is directed to the ring-like turbine 112 for continuous operation of the rotor 72 and tail rotor 116. This operation is necessary only when it is necessary to land the aircraft in very restricted and dangerous areas. The lower auxiliary rotor 72 and tail rotor 116 will continue to operate as usual driven by the air and gas driven turbine ring and the gas engine for a safe landing on land or water.

Elongated doors 472 and 472' located at the middle and rear of the fuselage are provided on the side walls 12. The doors are hinge mounted and are openable and closable by means of curved rack gear 474, and a gear 476 mounted in a shaft 482 located on platform 54. The end of the shaft 482 having gear and pulley 476' is turnable from the pilot's position in the pilot's compartment. The operation of the doors 472–472' especially the rear doors is necessary to direct the aircraft and obtain lateral stability. When the rear doors on one side are opened the high air compression following the opening will change the direction of travel of the aircraft when needed.

An elongated opening is provided at the lower rear end 426 of the tail rotor enclosure 15. At this opening 426 inside the enclosure 15 are two tiltable fins 428–428' mounted on shaft 430–430' and plate 54. Gears 429–429' on that shaft are in mesh with a worm gear 434 on shaft 436 mounted on plate 54 at its lower end. The upper end of shaft 436 has another gear 438. Gear 438 engages gear 440 mounted at the end of shaft 177. Shaft 177 is mounted on bracket 429 at one end and is longitudinally placed extending from the rear end of enclosure 15 forward to past gear box 92. At this end the shaft 177 has a handle 177' manually turnable from the pilot compartment. When the handle 177' is turned, shaft 177 turns shaft 436 with the worm gear 434', worm gear will turn gears 429–429' which will tilt the fins 428–428' up or down or keep them in horizontal position. This provides a way of controlling the longitudinal stability of the aircraft in flight and also controls the raising or lowering of the front of the aircraft for efficient maneuver.

A jet engine 362 is mounted on each side of the wall 12 of the fuselage adjacent to the top thereof for propelling the aircraft. The jet engines 362 are opposed to each other and each is tiltable. Each engine has a shaft 364 extending through an opening in the side wall of the fuselage. Mounted on the inner end of the shaft is a worm gear 366 meshing with a worm gear 368 on a shaft 370 which is turnable from the pilot's compartment through pulley 372 and wire 374.

A separate rotor unit of the turbine type 116 is disposed inside the fuselage at the rear thereof. The rear rotor unit 116 includes a dome-shaped plate 118 supported on the platform 54. The plate 118 has a central recess 120 in the top thereof for tiltably supporting a hollow cylindrical casing 122 with a curved bottom. An extension 124 on the top of the casing supports rotor bades 126. The blades support a turbine ring 125 on the ends thereof. The casing is normally in vertical upright position with the blades 126 horizontally disposed. Means are provided for tilting the casing and blades to an angle to the horizontal as shown in FIG. 5A. For this purpose, a gear segment 128 is fixed on the side of the casing. An upright post 130 is mounted on a portion of the plate 118 for supporting a horizontal rotatable shaft 132 mounting a gear 134 at one end thereof. The gear 134 meshes with the gear segment 128. The shaft 132 is turned by means of a flexible member 133 leading to the pilot's compartment. An upright post 136 mounted on the plate 118 has its upper end disposed between the edge walls of a slot 138 in the casing 122 for limiting the tilting movement of the casing and blades.

The main rotor unit 70 is rotated by means of compressed air or gas supplied from the exhausts of the jet engines 48, 48 supported in the wing structures 34, 34, and from the compressors 140, 140 supported on plate 56 at the sides of the fuselage, and also from the compressors 142, 142 adjacent compressors 140. A main pipe line 144 extends across the fuselage above the platform 54 extending downwardly at its ends into compartments 146, 146 between the double walls 12 and 148 underneath the wing structures 34. The ends of the main line pipe extend through openings in the outer walls 148 to the exhaust of the jet engines 48. The main pipe line 144 is connected to the compressors 140 by branch pipe lines 150 and is connected to the compressors 142 by pipes 152. Other branch pipes 154 are connected at one end to the main pipe line 140 and other end to the opposite sides of the turbine ring 112 delivering compressed air or gas against the vanes 114, as best seen in FIG. 6.

A small pulley 156 is supported on an upright shaft 158 mounted on a bracket 160 supported on platform 54 to one side of the pulley 98. A belt 162 connects the pulley 98 to the pulley 156. A bevel gear 164 is fixed on the top of shaft 158 and meshes with a bevel gear 166 on a shaft 168 depending from the top wall 14 of the fuselage. A large pulley 170 is also fixed on shaft 168 and turns therewith. Pulley 170 is on the same horizontal plane as pulley 115 secured to auxiliary lower rotor unit 72. An internal combustion engine 172 is mounted on the platform 54 with its drive shaft 174' extending horizontally. A shaft 176 is supported horizontally on an upright post 178 upstanding on platform 54 closely spaced from the internal combustion engine. A pinion gear 180 is fixed on one end of shaft 176' and is in mesh with bevel gear 166. A chain 182 connects the other end of shaft 176' with the drive shaft 174' of the engine 172 whereby drive is brought to the bevel gear 166. A bevel gear 184 is fixed on shaft 168 above the pulley 170. A rotatable shaft 186 is supported from the top wall 14 of the fuselage by brackets 188 and fixed on one end of the shaft 186 there is a bevel gear 190 in mesh with the top bevel gear 184. The shaft 186 extends rearwardly of the fuselage and its rear end is connected to gearing in a gear box 192 at the top thereof. Another shaft 194 has one end connected to the gearing in gear box 192 at the bottom thereof, the other end of the shaft 194 being operatively connected to the tail rotor unit 116 for turning the same. A universal joint 195 is provided for the shaft 194 to permit the shaft to move vertically to permit tilting of the rear rotor unit.

In FIG. 5, a valve mechanism is illustrated for controlling the flow of exhaust gases from the jet engine 48 on each wing structure 34. An elongated exhaust pipe 198 extends rearwardly from the jet engine and is formed with an opening 200 at its rear end and with an opening 202 at its other end. An intermediate opening 204 is formed in the pipe aligned with an opening in the wall of the wing structure 34. A slidable plate 206 formed with a rack 208 is adapted to close the opening 200 in the exhaust pipe 198. The teeth of rack 208 are in mesh with a gear 209 on a rotatable shaft 210. Shaft 210 is turnable by a belt 212 around a pulley 214 on shaft 210 and around a pulley 214 on a rotatable shaft 216 which is turnable from the pilot's compartment. The slidable plate 206 is adapted to be moved into position to close the entrance to the adjacent end 218 of the main pipe line.

The opening 202 at the rear end of the exhaust pipe 198 is adapted to be closed by a slidable plate 220 connected at one end to a compression spring 222, the other end of the spring being anchored to a stationary part of the wing structure.

The intermediate opening 204 is adapted to be closed by a slidable plate 224. Plate 224 is formed with a rack gear 226 on its outer surface in mesh with a gear 228 on one end of a shaft 230. A gear 232 on the other end of the shaft is operatively connected to a belt 234 entrained around a pulley 236 on a shaft 238 turnable from the pilot's compartment. A pulley 240 on the other end of shaft 230 anchors one end of a wire 242. The other end of the wire is anchored to the other end of slidable plate 220 so that when the opening 204 is open as seen in FIG. 5, the opening 202 at the rear is closed by plate 220. When the opening 204 is closed by plate 206 the wire 242 becomes slack and the spring 222 pull the closure plate 220 to open position.

When plate 206 is in open position, the exhaust gases from the jet engine pass upwardly through the end of the main pipe line. When the closure plate 206 is open the exhaust gases pass downwardly through the air vents 46.

An important feature of the invention is the provision of fins for controlling the angle of air intake to the lower coaxial rotor unit 72. Elongated aligned transverse openings 246 are formed in the upper wall 14 of the fuselage to the right and left of the center thereof above the blades 110 of the lower rotor unit 72. Shafts 248 are disposed underneath the openings adjacent thereto and journalled in brackets 250 depending from the top wall and in socket openings in the top wall. Worms 252 are secured around the shafts in spaced relation therealong. Shafts 254 extend across the openings and are journalled in the long edge walls of the openings at spaced intervals mounted on the shafts are worm gears 256 meshing with the worms 252. Fins 258 are fixed on the shafts 254 for closing and opening the openings 246. Hand wheels 260 are fixed on the inner ends of the shafts 248 for manually turning said shafts. When the aircraft operates at high speed these fins prevent overturning of the craft.

In FIG. 20, a modified form of a rear third rotor unit 116' is shown. In this modified form, an upper oblong hollow casing 580 and a bottom casing-box like casing 582 are connected by a tubular member 584. A shaft 586 extends through the tubular member 584 and fixed on the top thereof is a gear 588. The blades 590 are disposed vertically and are fixed on a shaft 592 extending through an opening in the casing 580 to the inside thereof. A bevel gear 594 is fixed on the inside of shaft 592 in mesh with a gear 588 on a shaft 586. A worm gear 596 is fixed on the shaft 586 on the bottom end thereof in casing 582. A shaft 598 extends through the casing 582 and carries a worm gear 600 on its inner end in mesh with the worm 596, so that turning of gear 602 of the shaft 598 turns the shaft 586. Then shaft 586 turns the rotor-blades right or left. This operation permits using the rotor unit for steering and for forward flight of the helicopter.

In FIGS. 22 and 26 there is illustrated another modification of the invention which is for all practical purposes the same as the form of FIG. 1 except for the control of the blade arms. Here arms 304 are hinged on a vertical leg 306 on a pin-ball bearing 308. Ball bearing 103 is slidable on cup 105. When the cam roller plate 107 is tilted the end of the arms which are mounted on the top of a single ball bearing 103 by a pin 99 will automatically tilt, tilting the blades. In this way is obtained the cyclic pitch angle change necessary for forward motion of the helicopter. The raising of the tube 91 while the cam plate 107 remains in its horizontal position maintains the collective pitch angle of the blades 93 necessary for vertical lift of the aircraft.

The operation of the helicopter is as follows. When on the ground the helicopter stands on its four wheels and can be taxied around like an auto or bus. On water it can be driven like a boat by using as a power source the rear rotor unit alone set in upward position. The helicopter can also be used as an air suspension car at any time.

In operation, when the helicopter is ready to take off the turbo-air compressor 140–140′ and 142–142′ are activated as well as the internal combustion engine 172. The compressed air from the turbo-air compressers is conducted into the main pipe line 144; and the exhaust gases from the jet engines 48 in the wings 34 are also conducted into the main pipe line 144. From the main pipe line the compressed air and gases pass upwardly through auxiliary pipe 145 controlled by valve 143, up through the tube 91 to the upper end of the tube. The branch pipe line 145 is fixed on a plate 4 mounted on a round frame 147 which frame is mounted on top of the tube 91. Swivel joint 702 is mounted on ball bearing 203 which is on frame 147. Flexible pipe 149 connects the swivel joint to the blade extensions 95′ and 94 through which the air and gases pass into channels 95 to the tip end of blade exhaust outlets 96 and then into the atmosphere. This produces the rotation of the first rotor unit 70. Rotation of the first rotor unit through its belts, pulleys and gears will rotate the second and third rotor units 72–116. The engine 172 will drive the central driving system that will drive all the rotors together; see FIG. 5. Once airborne full power will be obtained from the jet engine for forward speed that can attain 400 miles per hour. The maneuvering and directing of the aircraft is simple and can be done very swiftly by operation of the controls on the fins 258, 259 at the air intake of the second rotor unit 72; see FIG. 6. The landing of the aircraft is simple and can be attained by use of only the second rotor unit and third rotor unit with the first rotor unit 70 stopped. The safety margin is 100% better than in conventional helicopters because the present aircraft can land in an emergency in a restricted area by using the retro-jets from the wing system. See FIG. 5.

I claim:

1. In a vehicle, in combination:
   (a) an elongated fuselage having a top wall, a bottom wall, two side walls, and two end walls,
      (1) said top wall being formed with an aperture near the center thereof;
   (b) a first rotor unit including
      (1) a first shaft mounted in said aperture for rotation about a fixed, normally vertically extending axis and carrying key means,
      (2) a first set of blades mounted on said first shaft above said top wall,
      (3) discharging means for discharging a stream of propelling gas from the radially outer ends of said blades in a direction for thereby rotating said shaft,
      (4) pulley means on said shaft, and
      (5) shifting means for shifting said pulley means on said shaft between a first axial position in which said pulley means engages said key means and is thereby keyed to said shaft for joint rotation, and a second axial position in which said pulley means rotates freely on the shaft;
   (c) a central transmission in driving connection with said pulley means;
   (d) a second rotor unit freely rotatable on said first shaft in said fuselage, said second rotor unit including a second set of blades extending radially from said shaft;
   (e) rotating means for rotating said second rotor unit about said fixed axis in a direction for drawing air through said aperture into said fuselage;
   (f) fin means mounted in said aperture between said rotor units and adjustable for controlling the flow of said air;
   (g) vent means on said fuselage for discharging the air drawn into said fuselage by said second rotor unit from said fuselage in a downward direction;
   (h) a third rotor unit including a shaft and a third set of blades on the last-mentioned shaft, said third unit being mounted on said fuselage and rearwardly spaced from said first unit;
   (i) a first wing mounted on each of said side walls;
   (j) means for tilting each first wing on said fuselage;
   (k) a first jet engine in each of said wings;
   (l) a second wing on each side wall near the middle of said fuselage;
   (m) a second jet engine in each of said second wings;
   (n) an exhaust pipe extending rearwardly from said second jet engine and having three openings for flow therethrough of gas from said jet engine, one of said openings being connected with the blades of said first set for supplying said gas to said discharging means, the second opening communicating with vents at the lower end of the associated second wing, and the third opening being directed rearwardly and outward of said fuselage in a horizontally extending direction;
   (o) control means for controlling the flow of said gas through said three openings; and
   (p) motion transmitting means drivingly connecting said third rotor unit to said central transmission for rotation of said first and third sets of blades at different rotary speeds.

2. In a vehicle as set forth in claim 1, auxiliary motor means connected to said central transmission for rotating said first and third rotor units.

3. In a vehicle as set forth in claim 1, said fin means including two sets of fins offset from said first shaft in opposite radial directions, and controlling means for separately controlling each of said sets of fins.

4. In a vehicle as set forth in claim 1, said rotating means including an annular turbine member mounted on the blades of said second set and nozzle means for directing a stream of gas against said turbine member.

5. In a vehicle as set forth in claim 4, said nozzle means being connected with said exhaust pipe for receiving therefrom gas of said second jet engine.

6. In a vehicle as set forth in claim 4, a compressor, means for driving said compressor, said nozzle means being connected to said compressor for receiving a compressed gas from the same.

7. In a vehicle as set forth in claim 1, said rotating means including motion transmitting means interposed between said central transmission and said second rotor unit.

8. In a vehicle as set forth in claim 1, said fuselage being formed with a second aperture rearwardly spaced from said first-mentioned aperture, said shaft of the third rotor unit being arranged in said second aperture, the third rotor unit including tilting means for tilting the shaft of said third rotor unit in the longitudinal median plane of said fuselage.

9. In a vehicle as set forth in claim 8, said motion transmitting means connecting said third rotor unit to said central transmission including means for turning said third rotor unit in a direction for drawing air into said fuselage through said second aperture, said fuselage having another rearwardly directed opening, and flap means at said other opening for controlling the direction in which air drawn into said fuselage by said third rotor unit is discharged from the fuselage through said other opening.

10. In a vehicle as set forth in claim 8, said motion transmitting means rotating the blades of said third set in a direction for drawing air through said second aperture into said fuselage, and door means hingedly positioned on each side wall of said fuselage for opening and closing another aperture in said side wall and for thereby releasing from said fuselage air drawn into the same by the blades of one of said second and third rotor units.

11. In a vehicle as set forth in claim 1, said vent means including an air chamber extending in said fuselage along each of said side walls, means for directing into said air chambers the air drawn by said second rotor unit into said fuselage, each air chamber having a downwardly directed opening, and means for controlling the flow of air from said second rotor unit through said air chambers and said last-mentioned openings.

12. In a vehicle as set forth in claim 1, a hub mounted on said first shaft for rotation therewith about said fixed axis, the blades of said first set being elongated and being fastened to said hub for rotation therewith about said fixed axis, each blade having a longitudinal axis, and pitch control means for angularly displacing said blades about the longitudinal axes thereof, said pitch control means including a support mounted on said fuselage for movement in the direction of said fixed axis, but secured against rotation about said axis with said first shaft, a first plate member mounted on said support for tilting movement about a tilting axis transverse to said fixed axis, a second plate member mounted on said first plate member for tilting movement therewith and for rotation relative to said first plate member about said first axis, and motion transmitting means connecting ecah blade of said first set to a respective portion of said second plate member for rotating said second plate member with said first set of blades about said fixed axis and for angularly moving the connected blade about the longitudinal axis thereof in response to movement of the connected plate member portion in the direction of said fixed axis, tilting means for tilting said first plate member about said tilting axis, shifting means for axially shifting said support, and turning means for turning said support about said axis.

13. In a vehicle as set forth in claim 12, said motion transmitting means including an arm on each blade extending radially relative to the longitudinal axis of said plate, a universal joint on said portion of said second blade member, and a linkage connecting said joint to said arm.

14. In a vehicle as set forth in claim 13, said support being tubular, a conduit connecting said one opening of said exhaust pipe with each of said blades extending through said tubular support.

15. In a vehicle as set forth in claim 14, said conduit including manifold means arranged in said hub and a pipe leading from said manifold means to the portion of each blade adjacent the hub.

16. In a vehicle as set forth in claim 1, control means for controlling the pitch of said second set of blades.

References Cited

UNITED STATES PATENTS

| | | | |
|---|---|---|---|
| 2,969,937 | 1/1961 | Trojahn | 244—23 X |
| 2,992,684 | 7/1961 | Caddell. | |
| 3,116,898 | 1/1964 | Clark et al. | |
| 3,261,572 | 7/1966 | Gorton | 244—2 X |
| 3,291,242 | 12/1966 | Tinajero | 244—2 X |

MILTON BUCHLER, Primary Examiner

J. F. FORMAN, Assistant Examiner

U.S. Cl. X.R.

244—17.23, 17.25